(12) United States Patent
Hall

(10) Patent No.: US 8,455,805 B2
(45) Date of Patent: Jun. 4, 2013

(54) TWO DIMENSIONAL BARCODES AND MOBILE TERMINALS

(75) Inventor: Edward Hall, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 766 days.

(21) Appl. No.: 12/455,674

(22) Filed: Jun. 4, 2009

(65) Prior Publication Data

US 2009/0307232 A1  Dec. 10, 2009

(30) Foreign Application Priority Data

Jun. 5, 2008  (GB) .................................. 0810282.4

(51) Int. Cl.
  *G02B 7/04*  (2006.01)
  *G01N 21/86*  (2006.01)
(52) U.S. Cl.
  USPC .................................. 250/201.5; 250/559.29
(58) Field of Classification Search
  USPC .................... 250/216, 559.4, 559.04, 559.29, 250/559.01, 559.02, 559.03, 559.44, 201.5, 250/202, 559.36; 235/462.11, 462.01, 462.41, 235/462.09, 462.1; 707/10, 202; 382/181, 382/183, 233; 340/539.13
  See application file for complete search history.

(56) References Cited

U.S. PATENT DOCUMENTS

| | | | |
|---|---|---|---|
| 6,542,933 B1 | 4/2003 | Durst et al. | |
| 6,735,324 B1 * | 5/2004 | McKinley et al. | 382/100 |
| 6,749,120 B2 * | 6/2004 | Hung et al. | 235/472.01 |
| 2006/0065733 A1 | 3/2006 | Lee et al. | |
| 2009/0212111 A1 * | 8/2009 | Krichi et al. | 235/462.11 |
| 2009/0212113 A1 * | 8/2009 | Chiu et al. | 235/462.41 |
| 2009/0303036 A1 * | 12/2009 | Sahuguet | 340/539.13 |

FOREIGN PATENT DOCUMENTS

| | | |
|---|---|---|
| GB | 2446706 A | 8/2008 |
| WO | WO 00/65509 | 11/2000 |
| WO | WO 2007/113610 A1 | 10/2007 |

OTHER PUBLICATIONS

ISO/IEC 16022, "Information technology—Automatic identification and data capture techniques—Data Matrix bar code symbology specification," Second edition, Sep. 15, 2006, Table of Contents, Foreword, Introduction, Scope, 9 pp.

* cited by examiner

*Primary Examiner* — Georgia Y Epps
*Assistant Examiner* — Don Williams
(74) *Attorney, Agent, or Firm* — Muirhead and Saturnelli, LLC

(57) ABSTRACT

Processing a two dimensional (2D) barcode using a mobile telecommunications terminal having an image scanner includes obtaining a scanned image of the 2D barcode from the image scanner, decoding the image to obtain data, including a web address, and associating an identifier with the decoded web address, such that the identifier is identifiable by a remote proxy server to obtain information relating to the use of the barcode. A browser of the mobile terminal transmits a web page request including the decoded web address and the identifier. The web page request may be identified as originating from a 2D barcode at a server in a mobile telecommunications network. The request is received from a mobile terminal, an inserted identifier is identified in the request, and a record is saved, the record including an identifier of the mobile terminal or a user of the mobile terminal and the web page address.

20 Claims, 3 Drawing Sheets

TWO DIMENSIONAL BARCODES AND MOBILE TERMINALS

TECHNICAL FIELD

This application relates to two dimensional (2D) barcodes, and more particularly to a method of processing 2D barcodes using a mobile telecommunications terminal. This application further relates to a mobile terminal and an application program on a mobile terminal for processing 2D barcodes. Still further, this application relates to a remote server for processing data relating to web page requests initiated using 2D barcodes

BACKGROUND OF THE INVENTION

Two dimensional (2D) barcodes are a compact form of holding information. 2D barcodes contain more information than conventional one dimensional linear barcodes in a given area. As a comparison, conventional linear barcodes get wider as more data is encoded, since data is encoded in the widths and spacing between printed parallel lines, whereas 2D codes make use of the vertical dimension to incorporate more data. There are various forms of 2D codes, including Data Matrix codes, QR (Quick Response) codes, MaxiCodes and Sema-Codes. All use the same two dimensional principles, although using different encoding algorithms and different symbologies involving patterns of symbols such as squares, lines, dots, concentric circles, text codes hidden within images, and combinations thereof. The system described herein may apply to any such 2D machine readable codes.

As an example of how a 2D code is created, a Data Matrix code is a two-dimensional matrix barcode consisting of black and white square cells arranged in either a square or rectangular pattern. A white cell may be a binary "0" and a black cell a binary "1", or vice versa. The Matrix also includes "handles" and "syncs" which are perpendicular lines used to allow machine readers to recognize the pattern so that they can be decoded correctly. FIG. 1b illustrate an example of such a machine-readable matrix code, while FIG. 1a illustrates an example of a QR code.

The encoding for data matrices is covered by an ISO standard, ISO/IEC16022—International Symbology Specification, Data Matrix, and is in the public domain.

2D codes have found a particular utility in the mobile telecommunications field, especially in convenience-oriented applications aimed at mobile phone users. In this regard, 2D codes, such as the ones shown in FIGS. 1a and 1b, can be used to store information such as contact information and/or URL addresses, and may appear in various media, such as magazines, on signs, business cards or any other printed or displayed form in relation to which a user may want further information. In this regard, the matrix codes in FIGS. 1a and 1b, with an appropriate optical reader, can be decoded to the URI www.vodafone.co.uk. The FIG. 1a code is a QR code, and that of FIG. 1b is a Data Matrix barcode.

In the mobile communication arena, mobile terminals may be capable of, or can be adapted to, read matrix codes. For example, mobile terminals with a camera associated with appropriate reader software can scan the image of a 2D code and extract the information contained therein. Where the 2D code contains a URL address, the software can cause the mobile terminal's browser to launch and redirect to the programmed URI. In this way users are able to effectively "click" on a barcode of interest with their mobile terminal and seamlessly connect to relevant online content.

This is particularly useful for users, as they can transfer to a relevant Internet site without having to manually type the URL address—which can be particularly cumbersome when the address is long, and even more so using a condensed mobile phone keyboard.

There are generally considered to be two types of URL address transfer approaches with mobile terminals, a direct approach and an indirect approach.

In the direct approach, when a user operates their mobile terminal to capture a 2D barcode image, and the phone's software translates the code into a URL, the translated URL directs the terminal's browser straight to the website at the URL address (e.g. www.Nike.com), with no interaction with third parties.

Whilst this approach achieves the desired result for the user, from a marketing point of view, valuable information about the user and their interests is available but not taken advantage of. In this regard advertisers are always interested in how a user arrived at their site.

To address this, an "indirect" approach has been developed, whereby the 2D barcode, for instance, specifies a network service provider site relating to a particular topic (e.g. www.vodafone.com/Nike_offer). The phone's software translating the 2D barcode therefore directs the user to this address on the network operator's server, where user information can be obtained, before that server redirects the user to a relevant site that is associated with the initially designated one, such as www.nike.com/Vodafone_offer.

This approach allows the network operator to determine which of their subscribers are interested in which topics/products and the like, and from there put together valuable marketing information based upon location, demographics etc.

However, the value of the indirect approach in gathering the information lies in cooperation between the different entities (e.g. Vodafone and Nike). That is, for the 2D barcode to be directly translatable as www.vodafone.com/Nike_offer, it is necessary for a cooperation agreement to be in place, and for manufacturers, such as Nike, to place such a 2D code on their products and/or in their advertising.

Further, the indirect method requires specific look-up servers for resolving mobile codes to be installed in the telecommunication operator's network. When a terminal sends the decoded information from an indirect code to these servers, they perform a look-up and redirect the user to the correct destination. When a network operator's look-up servers do not have knowledge of a specific indirect code, this requires code arbitration to be implemented in a centralized way to ensure that all codes can be resolved.

The indirect approach therefore has its limitations, as agreements cannot feasibly be made with the entire marketplace, and also the "indirect" 2D barcode will only be usable as long as the look-up server remains up-to-date in operation.

There is therefore a need for an improved approach for utilizing 2D barcodes in relation to mobile telecommunications networks.

SUMMARY OF THE INVENTION

According to the system described herein, a method of processing a two dimensional (2D) barcode using a mobile telecommunications terminal having an image scanner includes: obtaining a scanned image of the 2D barcode from the image scanner; decoding the image to obtain data, the data including a web address; and associating an identifier with the decoded web address, such that the identifier is identifiable by a remote server in order to obtain information relating to the use of the 2D barcode.

According further to the system described herein, an application for use on a mobile terminal in a mobile telecommunications network, the application configured for decoding two dimensional (2D) barcode images, includes: an input device configured to receive a scanned image of a 2D barcode; a decoding device configured to decode the scanned image and obtain data therefrom; and a processing device, when the data includes a web address, configured to insert an identifier into a web page request, such that the identifier is identifiable by a remote server, in order to obtain information relating to the use of the 2D barcode. The remote server may be a remote proxy server.

According further to the system described herein, a method of a network element in a mobile telecommunications network identifying a web page request as originating from a two dimensional (2D) barcode includes: receiving a web page request; identifying an inserted identifier in the web page request as indicating a 2D barcode source; and saving a record in relation to the use of the 2D barcode.

According further to the system described herein, a server, provided in a mobile telecommunications network, is configured to identify a web page request as originating from a two dimensional (2D) barcode, the server including: a receiver for receiving a web page request from a mobile terminal; a processing device configured to: identify an inserted identifier in the web page request as indicating a 2D barcode source; and save a record in relation to the use of the 2D barcode. The saved record may further include an identifier of the mobile terminal or a user of the mobile terminal and the web page address.

In this way, through appropriate processing, the user of 2D barcodes can be monitored and tracked by a network operator without imposition on users or advertisers.

These approaches may be transparent to the user and do not redirect the user away from the URL contained in the 2D barcode that the user chose to view. Embodiments of the system described herein provide a mechanism via which a remote server may determine when a website request is initiated via a 2D barcode, where previously this had not been feasible using the "direct" approach.

BRIEF DESCRIPTION OF THE DRAWINGS

Embodiments of the system described herein will be now explained in relation to the figures, in which.

DETAILED DESCRIPTION OF VARIOUS EMBODIMENTS

Certain elements of a mobile telecommunications network, and its operation, will now briefly be described with reference to FIG. 2.

Each base station (BS) (10, 14) corresponds to a respective cell of its cellular or mobile telecommunications network and receives calls/data from and transmits calls/data to a mobile terminal in its cell by wireless radio communication in one or both of the circuit switched or packet switched domains. Such a subscriber's mobile terminal (or User Equipment—UE) is shown at 1. The mobile terminal may be any portable communications device, including a handheld mobile telephone, a personal digital assistance (PDA), a laptop computer equipped with a datacard, and a laptop computer with an embedded chipset containing the functionality of a mobile telephone.

In a GSM (2G) mobile telecommunications network, each base station subsystem (10, 14) comprises a base station controller (BSC) controlling at least one base transceiver station (BTS). The BTSs and BSCs comprise the radio access network.

In a UMTS (3G) mobile telecommunications network, a corresponding base station subsystem (10, 14) comprises a radio network controller (RNC) controlling at least one node B. The node B's and RNC's comprise the radio access network (RAN).

In the proposed LTE mobile telecommunications network, a corresponding base station subsystem (10, 14) will comprise an eNodeB (evolved Node B), which effectively combines the Node B and RNC functionality into a single entity.

Conventionally, base stations are arranged in groups and each group of base stations is controlled by a Mobile Switching Centre (MSC) 11 which supports communications in the circuit switched domain, typically voice calls, and a corresponding Serving GPRS Support Node (SGSN) 12 which supports communications in the packet switched domain—such as GPRS data transmissions and Internet communications. Gateway GPRS Support Node (GGSN) 13 provides IP connectivity, in that it provides an interface to Packet Data Networks (PDN) 16 (for example, the Internet) via Proxy Server 15.

It is in relation to a network of any such construction that a first embodiment of the system described herein will now be described.

Figure 3:
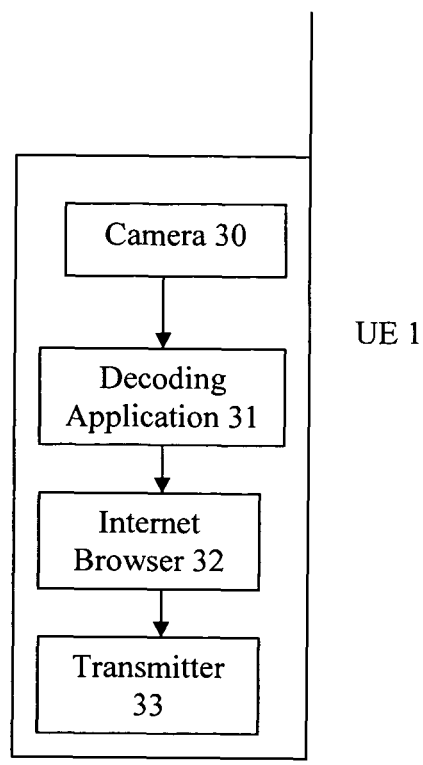
FIG. 3 illustrates a schematic of a mobile terminal and some of its components according to an embodiment of the system described herein

With reference to FIG. 3, to effect this first embodiment of the system described herein, the mobile terminal 1 includes an image scanner 30, which is in communication with a decoding application 31. When the user of the mobile terminal wishes to decode a 2D barcode they firstly scan the image using the image scanner 30. The image scanner may be an in-built camera with a close focus or macro mode. The camera may be capable of operating as a normal camera, and as an image scanning device when utilized in conjunction with the decoding application 31 or other decoding device.

The decoding application 31 may be downloaded by the user onto the mobile terminal or preloaded. The application 31 may be configured to read the scanned 2D barcode and decode usable information therefrom. Various decoding techniques may be utilized in connection with the system described herein. In fact, various application programs have been developed to decode QR codes and/or Data Matrix codes, in particular, such as the Kaywa reader, QuickMark reader and i-nigma reader. Further, many of the current Nokia handsets, such as the N93 and N95 also have a preinstalled 2D barcode reader application. The decoding application 31 may be computer software stored on a computer readable storage medium, the computer software including executable code that may be executed by a processor to perform the functions described herein. The computer readable storage medium may include various types of computer memory and portable computer readable storage mediums.

Figure 1A:
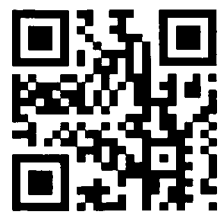
FIG. 1*a* illustrates an example of a QR code.

To illustrate the result of the decoding process by a given application program, the embedded code that can be obtained by decoding the FIG. 1*a* QR barcode is:

```
<img          src="http://encode.inigma.com/QRCode/
    img.php?d=URL%3Awww.vodafone.co.uk&c=&s=4"
    alt=" "/> (1)
```
This shows that the barcode was encoded by an I-Nigma encoder using the QR code methodology, and that the information encoded is a URL address www.vodafone.co.uk.

Figure 1B:
FIG. 1*b* illustrates an example of a matrix code.

Similarly, the embedded code of the FIG. 1b Data Matrix barcode is:
```
<img          src="http://encode.inigma.com/DMtrx/
    img.php?d=URL%3Awww.vodafone.co.uk&c=&s=4"
    alt=" "/> (2)
```
This shows that the embedded code was encoded by an I-Nigma encoder using the Data Matrix code methodology, and that the information encoded is a URL address www.vodafone.co.uk.

Upon decoding this information, where the application program finds the encoded information includes a URL address, the application program may then activate an Internet browser 32, also associated with mobile terminal 1, to launch the webpage www.vodafone.co.uk. Alternatively the application program 31 may present the URL address on a screen of the mobile terminal for the user to manually activate, as and when required.

According to this first embodiment of the system described herein, before the URL is passed on to the browser, the application program is configured to add information for use by a remote server responsible for relaying the page request to the web page identified by the URL, or obtaining a cached version of the requested web page. The remote server may be a proxy server 15.

The decoding application may add any information. More particularly, however, the decoding application may add information that allows a remote server, particularly a proxy server. to identify that the web page has been accessed using a 2D barcode. In this regard, the decoding application may be configured, upon noting that the decoded information contains a barcode, add an identifier to the URL/URI information to be transmitted, such as:

www.vodafone.co.uk?iamabarcode=true (3)

In HTML, the use of "?" serves to delimit the boundary between the URI and a query string in relation to the URI. In this embodiment of the system described herein, it is being used to provide a proxy server with information on the source of the URL address.

Figure 2:
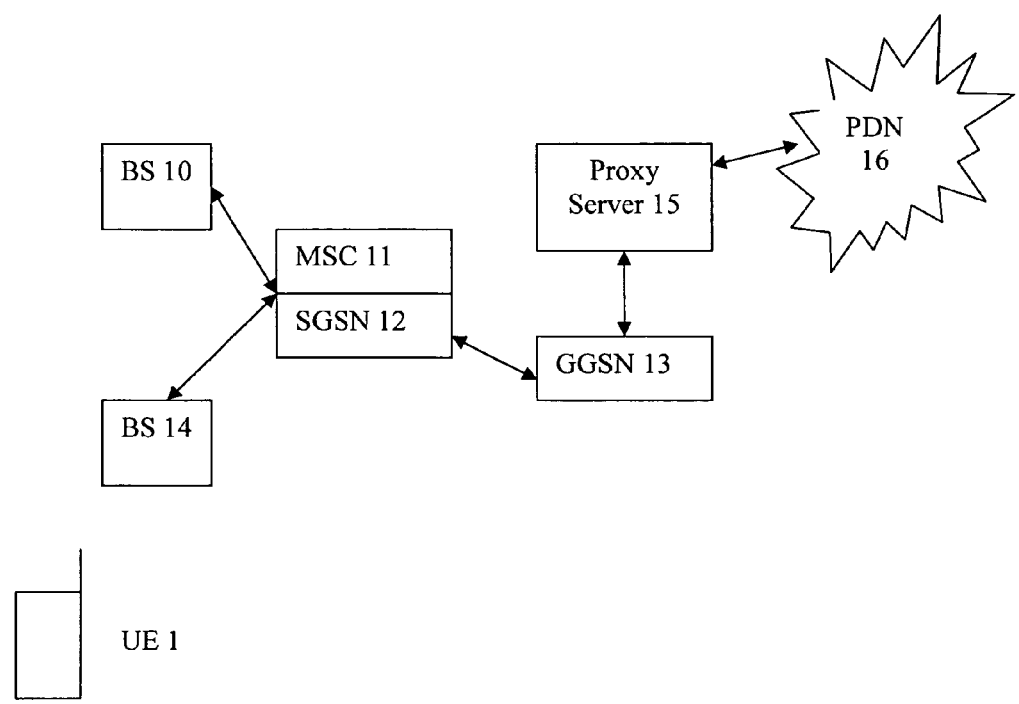
FIG. 2 illustrates mobile telecommunications network including an access point in addition to a conventional base station, in which the embodiments of the system described herein may be implemented.

The address at (3) is forwarded by the mobile terminal's browser through the network of FIG. 2 towards the proxy server in the usual manner. The communication will be a web page request, and include the address at (3), as well as an identifier of the mobile terminal/terminal user (e.g. MSISDN, IMSI etc), as is usual, so that the requested web page can be routed to the requesting terminal.

At the state-aware proxy server 15, upon receipt of the new web page request from the browser, the server will generate and maintain a server-side data record that includes user attribute information for the user session being set up with the web browser. The proxy server identifies the identifier within the URL and registers that the user is trying to access a website that it rendered from a barcode. The server will recognize the added text and save a record relating to this web page request in a permanent area of memory. In this regard the server will typically store details relating to the requested web address, such as an identifier of the mobile terminal/terminal user, an identifier of the mobile terminal's location (e.g. cell ID or a GPS location) and an indication that the URL was initiated from a bar code, such as the added text itself.

The proxy server may also strip off the added information in order to ensure that no external signalling is affected by the added field, before relaying the web page request to its intended destination.

In this way, by the decoding application on the terminal being configured to cooperate with the proxy server, valuable data regarding the use of 2D codes may be obtained using the "direct" transmission mode, without requiring specific data to be encoded into the 2D codes, as per the "indirect" approach.

Not only may such data be obtained to determine an advertising source, but it may also for data-mining purposes, to determine user interests, and also in relation to audit trails so as to log a record of which customers are using which services.

A further use for the information is in relation to charging, in that it enables a network operator to charge its users a premium for using their mobile terminal to be directed to a particular site designated by a barcode, since the source of the website request can be confirmed. Similarly, it enables a network operator to charge its advertisers a premium for each customer that uses a barcode to visit the advertiser's site. The system described herein therefore provides an enhanced and non-intrusive mechanism for obtaining this source data, with only a few changes to network operability being required, specifically in relation to the proxy server's operation and that of the decoding application. A particular advantage is that the embodiments of the system described herein are functionally independent of the coding method used.

Further, the insertion of the identifier by the decoding application 31 is invisible to the user and also invisible to external web sites where the identifier is stripped from the web page request.

A further advantage is that since this technique is performed by the telecommunications network operator, the user's privacy is not undermined, since the user has already separately provided the service provider with their identity details, so all the service provider is collecting via this technique is data relating to the user's usage of 2D barcodes. In fact, this approach has security benefits for the user, since the information will not be freely obtainable by unauthorized third parties.

The embodiments of the system described herein are to be considered as illustrative, with changes and additions being possible.

For instance, the use of the query string to incorporate additional information is just one approach in HTML of conveying information to a remote proxy server, and other methods are possible.

In an alternative embodiment of the system described herein, the terminal client has a predetermined destination server to which it is configured to send all scanned codes. That is, the terminal client will not only forward direct-transfer barcode web addresses but also indirect-transfer barcode addresses. The address of the predetermined destination server could be, for example, www.vodafone.com/barcodes. This destination address instruction may be preloaded in the terminal client, or the terminal client may be configured via an over-the-air (OTA) instruction download.

It is to be appreciated that this technique may be advantageously distinct from the indirect barcode transfer approach in that the transfer destination address is not embedded in the barcode itself, but inserted by the terminal client. This embodiment therefore has greater flexibility than the indirect approach, as the terminal client can be updated by an OTA download as necessary, whereas the barcode itself cannot without being physically replaced.

Upon the 2D barcode being scanned, and the direct/indirect web address being extracted, the terminal client would then send the extracted address to the predetermined barcode resolution server, by altering the address to include the predetermined destination server address, for example. www.vodafone.com/barcodes? www.nike.com/latest_offer_page.

The barcode server page would then compare the scanned parameter (in this example www.nike.com/latest_offer_page) against its look up table of known business arrangements, white lists, black lists etc and perform an appropriate step, such as:
  i) redirecting to the scanned code directly e.g. www.nike.com/latest_offer_page;
  ii) performing a redirection to the indirect destination, perhaps with some added or altered information. For example, where it is able to be determined that the subscriber of the terminal is male or interested in men's apparel, the web page as scanned, namely www.nike.com/latest_offer_page may be amended to www.nike.com/may2008offers_male; or
  iii) block the transaction e.g. www.vodafone.com/content_control.

A further advantage of this embodiment of the system described herein is that the network operator can have a single new server making decisions, and need not reuse the proxy server. Also, enhanced efficiencies result from the direct and indirect codes are all being sent to the same server.

In further embodiments the user may subscribe to benefit from offers from particular companies. These subscriptions are stored against the user's account and are included in the look up table. In this case, the barcode server page will check its look up table against the requesting user and company whose web address the user has scanned. If the user has subscribed to benefit from offers from that company whose web address he has scanned, he may be directed to a specific URL for those who have subscribed to offers from that company.

It will be clear to those skilled in the art that it is possible for the proxy server of the first embodiment of the system described herein also to monitor the incoming barcode request and to check the requested URL against a look up table of known business arrangements.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of processing a two dimensional (2D) barcode using a mobile telecommunications terminal having an image scanner, the method comprising:
  obtaining a scanned image of the 2D barcode from the image scanner;
  decoding the image to obtain data, the data including a web address; and
  associating an identifier with the decoded web address, such that the identifier is identifiable by a remote server in order to obtain information relating to the use of the 2D barcode, wherein the information obtained by the remote server registers that the web address is being accessed using the 2D barcode and indicates that the web address has been initiated by the mobile telecommunications terminal from the 2D barcode.

2. The method of claim 1, further comprising:
  inserting the identifier into the web address.

3. The method of claim 1, wherein the remote server configured to identify the identifier is a remote proxy server.

4. A method of operating a network element in a mobile telecommunications network to identify a web page request as originating from a two dimensional (2D) barcode, the method comprising:
  receiving the web page request from a mobile terminal;
  identifying an inserted identifier in the web page request as indicating a 2D barcode source, wherein the inserted identifier is identifiable by a remote server in order to obtain information relating to use of the 2D barcode, wherein the information obtained by the remote server registers that the web address is being accessed using the 2D barcode and indicates that the web address has been initiated by a mobile terminal from the 2D barcode; and
  saving a record in relation to the use of the 2D barcode.

5. The method of claim 4, further comprising incorporating into the record at least one of:
  i) an identifier of the mobile terminal or a user of the mobile terminal which transmitted the web page request; and
  ii) a web page address included in the web page request.

6. The method of claim 4, further comprising:
  stripping the inserted identifier from the web page request before forwarding the web page request.

7. The method of claim 4, further comprising:
  comparing the requested web address in the web page request with a look up table of known arrangements with web addresses and, if an arrangement exists with the requested web address, forwarding the web page request to a web address relating to the arrangement.

8. A non-transitory computer readable storage medium storing an application for use on a mobile terminal in a mobile telecommunications network, the application configured for decoding two dimensional (2D) barcode images and comprising:
  executable code that receives a scanned image of a 2D barcode;
  executable code that decodes the scanned image and obtains data therefrom; and
  executable code that, when the data includes a web address, inserts an identifier into a web page request, such that the identifier is identifiable by a remote server to obtain information relating to use of the 2D barcode, wherein the information obtained by the remote server registers that the web address is being accessed using the 2D barcode and indicates that the web address has been initiated by the mobile terminal from the 2D barcode.

9. The non-transitory computer readable storage medium of claim 8, wherein the application further comprises executable code that inserts the identifier into the web address included in the web page request.

10. A server configured to identify a web page request as originating from a two dimensional (2D) barcode, the server comprising:
  a receiver for receiving a web page request from a mobile terminal; and
  a processing device that identifies an inserted identifier in the web page request as indicating a 2D barcode source, and saves a record in relation to use of the 2D barcode, wherein the inserted identifier is identifiable by a remote server in order to obtain information relating to the use of the 2D barcode, wherein the information obtained by the remote server registers that the web address is being accessed using the 2D barcode and indicates that the web address has been initiated by the mobile terminal from the 2D barcode.

11. The server of claim 10, wherein the processing device includes, in the saved record, at least one of:
   i) an identifier of the mobile terminal transmitting the web page request or of a user of the mobile terminal; and
   ii) a web page address included in the web page request.

12. The server of claim 10, wherein the processing device strips the inserted identifier from the web page request before forwarding the web page request.

13. The server of claim 10, wherein the server is a proxy server.

14. A non-transitory computer readable storage medium storing an application for use on a mobile terminal in a mobile telecommunications network, the application configured for decoding two dimensional (2D) barcode images and comprising:
   executable code that receives a scanned image of a 2D barcode;
   executable code that decodes the scanned image and obtains data therefrom; and
   executable code that, when the data includes a web address, embeds the web address into a web page request relating to a predetermined remote server to allow the predetermined remote server to determine information relating to at least one of: the scanned web page and a user of the mobile terminal, wherein the information obtained by the remote server registers that the web address is being accessed using the 2D barcode and indicates that the web address has been initiated by the mobile terminal from the 2D barcode.

15. A mobile terminal, comprising:
   a decoding system, the decoding system including:
      an input device that receives a scanned image of a 2D barcode;
      a decoding device that decodes the scanned image and obtains data therefrom; and
      a processing device that, when the data includes a web address, inserts an identifier into a web page request, such that the identifier is identifiable by a remote server to obtain information relating to use of the 2D barcode, wherein the information obtained by the remote server registers that the web address is being accessed using the 2D barcode and indicates that the web address has been initiated by the mobile terminal from the 2D barcode.

16. The mobile terminal of claim 15, wherein the processing device inserts the identifier into the web address included in the web page request.

17. The mobile terminal of claim 15, wherein the processing device embeds the web address into a web page request relating to the remote server to allow the remote server to determine information relating to at least one of: the scanned web page and a user of the mobile terminal.

18. The mobile terminal of claim 15, wherein the decoding system includes an application stored on a computer readable storage medium, wherein the input device, the decoding device and the processing device are components of the application and include executable code stored on the computer readable storage medium.

19. The mobile terminal of claim 15, further comprising:
   an image scanner that generates the scanned image of the 2D barcode.

20. The mobile terminal of claim 15, wherein the mobile terminal is part of a mobile telecommunications network.

* * * * *